(12) United States Patent
Dunbar et al.

(10) Patent No.: US 9,660,905 B2
(45) Date of Patent: May 23, 2017

(54) SERVICE CHAIN POLICY FOR DISTRIBUTED GATEWAYS IN VIRTUAL OVERLAY NETWORKS

(71) Applicant: Futurewei Technologies, Inc., Plano, TX (US)

(72) Inventors: Linda Dunbar, Plano, TX (US); Lucy Yong, Georgetown, TX (US)

(73) Assignee: Futurewei Technologies, Inc., Plano, TX (US)

( * ) Notice: Subject to any disclaimer, the term of this patent is extended or adjusted under 35 U.S.C. 154(b) by 243 days.

(21) Appl. No.: 14/251,397

(22) Filed: Apr. 11, 2014

(65) Prior Publication Data

US 2014/0307744 A1   Oct. 16, 2014

Related U.S. Application Data

(60) Provisional application No. 61/811,635, filed on Apr. 12, 2013.

(51) Int. Cl.

| | |
|---|---|
| *H04L 12/26* | (2006.01) |
| *H04L 12/721* | (2013.01) |
| *H04L 12/715* | (2013.01) |
| *H04L 29/08* | (2006.01) |
| *H04L 12/24* | (2006.01) |

(52) U.S. Cl.
CPC .......... *H04L 45/44* (2013.01); *H04L 41/5054* (2013.01); *H04L 45/38* (2013.01); *H04L 45/64* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,953,865 B1 | 5/2011 | Miller et al. | |
| 9,036,504 B1 | 5/2015 | Miller et al. | |
| 2003/0112809 A1 | 6/2003 | Bharali et al. | |
| 2008/0181382 A1* | 7/2008 | Lean ................... | H04M 3/4217 |
| | | | 379/201.12 |
| 2009/0304000 A1 | 12/2009 | Masputra et al. | |

(Continued)

OTHER PUBLICATIONS

Lasserre, M., et al., "Framework for DC Network Virtualization," draft-ietf-nvo3-framework-03.txt, Jul. 4, 2013, 25 pages.

(Continued)

*Primary Examiner* — Brandon Renner
(74) *Attorney, Agent, or Firm* — Conley Rose, P.C.

(57) ABSTRACT

A method forwarding data traffic based on a service chain policy for distributed gateway located within a network virtualization edge (NVE). The NVE may receive, within a first virtual overlay network, a data packet destined for a destination tenant end point located in a second virtual overlay network. The NVE may determine that a network service function is unavailable to treat the data packet between the first virtual overlay network and the second virtual overlay network. In order to route the data packet, the NVE may obtain a service chain policy that provides the location of a network node configured to treat the data packet with the network service function. The NVE may transmit the data packet toward the network node. A service chain policy may correspond to a sequence of network nodes that represents a path to the destination tenant end point.

17 Claims, 7 Drawing Sheets

(56) References Cited

U.S. PATENT DOCUMENTS

| | | | |
|---|---|---|---|
| 2012/0176994 A1* | 7/2012 | Huang | H04L 47/122 370/329 |
| 2012/0198075 A1 | 8/2012 | Crowe et al. | |
| 2013/0058346 A1 | 3/2013 | Sridharan et al. | |
| 2013/0272305 A1* | 10/2013 | Lefebvre | H04L 47/24 370/392 |
| 2013/0311663 A1 | 11/2013 | Kamath et al. | |
| 2013/0318219 A1 | 11/2013 | Kancherla | |
| 2013/0322443 A1 | 12/2013 | Dunbar et al. | |
| 2014/0003433 A1* | 1/2014 | Narayanaswamy | H04L 67/327 370/392 |
| 2014/0098674 A1* | 4/2014 | Sonoda | H04L 49/3009 370/238 |
| 2014/0136676 A1 | 5/2014 | Chow et al. | |
| 2014/0146664 A1 | 5/2014 | Amante | |
| 2014/0164617 A1* | 6/2014 | Jalan | H04L 67/1002 709/226 |
| 2014/0201733 A1 | 7/2014 | Benny et al. | |
| 2014/0233569 A1 | 8/2014 | Yong et al. | |

OTHER PUBLICATIONS

Lasserre, M., et al., "Framework for DC Network Virtualization," draft-ietf-nvo3-framework-04.txt, Nov. 12, 2013, 25 pages.

Lasserre, M., et al., "Framework for DC Network Virtualization," draft-ietf-nvo3-framework-05.txt, Jan. 20, 2014, 24 pages.

Kreeger, L, et al., "Network Virtualization NVE to NVA Control Protocol Requirements," draft-ietf-nvo3-nve-nva-cp-req-01.txt, Oct. 21, 2013, 12 pages.

Black, D., et al., "An Architecture for Overlay Networks (NVO3)," draft-narten-nvo3-arch-00.txt, Jul. 8, 2013, 24 pages.

Black, D., et al., "An Architecture for Overlay Networks (NVO3)," draft-narten-nvo3-arch-01.txt, Oct. 22, 2013, 27 pages.

Narten, T., Ed., et al., "Problem Statement: Overlays for Network Virtualization," draft-narten-nvo3-overlay-problem-statement-04.txt, Aug. 10, 2012, 21 pages.

Yong, L., et al., "Network Virtualization Edge (NVE)," draft-yong-nvo3-nve-00.txt, Nov. 3, 2013, 16 pages.

Yong, L., et al., "Network Virtualization Edge (NVE)," draft-yong-nvo3-nve-01.txt, Nov. 11, 2013, 17 pages.

Fang, L., et al., "BGP IP VPN Virtual PE," draft-fang-l3vpn-virtual-pe-02, Apr. 7, 2013, 25 pages.

Casado, M., et al., "Ethane: Taking Control of the Enterprise," SIGCOMM'07, Aug. 27-31, 2007, 23 pages.

Sherry, J., et al., "Future Architectures for Middlebox Processing Services on the internet and in the Cloud," Technical Report No. UCB/EECS-2012-240, Dec. 13, 2012, 81 pages.

Foreign Communication From a Counterpart Application, PCT Application No. PCT/US2014/033868, International Search Report dated Aug. 25, 2014, 4 pages.

Foreign Communication From a Counterpart Application, PCT Application No. PCT/US2014/033868, Written Opinion dated Aug. 25, 2014, 6 pages.

Black, D., et al., "An Architecture for Overlay Networks (NV03)," draft-ieft-nvo3-arch-00.txt, Dec. 17, 2013, 27 pages.

Office Action dated May 19, 2016, 17 pages, U.S. Appl. No. 14/180,636, filed on Feb. 14, 2014.

* cited by examiner

SERVICE CHAIN POLICY FOR DISTRIBUTED GATEWAYS IN VIRTUAL OVERLAY NETWORKS

CROSS-REFERENCE TO RELATED APPLICATIONS

The present application claims priority to U.S. Provisional Patent Application 61/811,635, filed Apr. 12, 2013 by Linda Dunbar et al. and entitled "Service Chain Mechanism for Pseudo Gateway in Virtual Overlay Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer virtualization has dramatically altered the information technology (IT) industry in terms of efficiency, cost, and the speed in providing new applications and/or services. The trend continues to evolve towards network virtualization, where a set of tenant end points, such as virtual machines (VMs) and/or hosts, may communicate in a virtualized network environment that is decoupled from an underlying physical network, such as a data center (DC) physical network. Constructing virtual overlay networks using network virtualization overlay (NVO3) is one approach to provide network virtualization services to a set of tenant end points within a DC network. NVO3 is described in more detail in the Internet Engineering Task Force (IETF) document, draft-ietf-nvo3-arch-01, published Oct. 22, 2013 and the IETF document, draft-ietf-nvo3-framework-05, published Jan. 4, 2014, both of which are incorporated herein by reference as if reproduced in their entirety. With NVO3, one or more tenant networks may be built over a common DC network infrastructure where each of the tenant networks comprises one or more virtual overlay networks. Each of the virtual overlay networks may have an independent address space, independent network configurations, and traffic isolation amongst each other.

Typically, one or more default gateways may be setup for the virtual overlay networks within a tenant network to route data packets between different networks. For instance, a default gateway may route traffic between two virtual overlay networks located within the same tenant network and/or different tenant networks. Additionally, the default gateway may route traffic from a virtual overlay network to different types of networks, such as other types of virtual networks (e.g. virtual local area network (VLAN) and Internet Protocol (IP)-virtual private network (VPN)), a physical network, and/or the Internet. However, to route data traffic, the default gateway may maintain and enforce a variety of routing policies, such as inter-subnet forwarding policies and network service functions (e.g. firewall), in order to properly forward data traffic from a source end point to a destination end point. Unfortunately, as DC networks continue to expand, routing intra-DC traffic (e.g. data traffic forwarded within a DC network) using default gateways may not only cause sub-optimal routing, but may also produce processing bottlenecks caused by constant policy checking at the default gateways.

SUMMARY

In one example embodiment, the disclosure includes a network virtualization edge (NVE) that comprises a distributed gateway and is configured to implement a service chain policy to route data traffic between two virtual overlay networks. The NVE may receive a data packet from a first virtual overlay network and determine that the data packet is destined for a destination tenant end point located within a second virtual overlay network. To route the data packet, the NVE may determine one or more treatment policies that need to be applied to forward the data packet to the destination end point. To properly route the data packet, the NVE may forward the data packet using a service chain policy. The service chain policy may identify a sequence of network nodes (e.g. one or more network nodes) that may have the needed service functions attached and/or have the needed treatment policies to properly route the packets.

In another example embodiment, the disclosure includes obtaining and using a service chain policy for distributed gateways that may reside in the NVEs. The distributed gateways may store a service chain policy or query a service chain policy from a centralized controller or some other authoritative entity when receiving a data packet. The distributed gateway may determine that it may not have the needed treatment policy/capability and/or not have the needed service functions attached to apply treatment to the data packet. Afterwards, the distributed gateway may determine, using the service chain policy, a one or more network nodes that have the treatment policies and/or have the service functions attached needed to treat the data packet. Based on the service chain policy, the distributed gateway may transmit the data packet to the next network node that has the treatment capability.

In yet another example embodiment, the disclosure includes a network node that forwards data traffic based on a service chain policy. The network node may receive a data packet of one virtual network destined for a destination tenant end point of the second virtual overlay network. The network node may determine that the needed network service functions are unavailable to treat the data packet between the first virtual overlay network and the second virtual overlay network. In order to route the data packet, the network node may obtain a service chain policy that provides a set of network nodes that either have the needed treatment policies/capability and/or have the service functions attached to treat the data packet. The network node may transmit the data packet toward the first network node in the set. A service chain policy may correspond to a path or a sequence of network nodes to the destination tenant end point where each of the network nodes have the treatment policies/capabilities and/or has one or more service functions to treat the packets.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various example embodiments that distribute and implement service chain policies for distributed gateways. Distributed gateways within NVEs may be configured with inter-network forwarding policies used to forward data between two or more virtual overlay networks (e.g. subnets). However, tenant end points (e.g. a host) of a virtual overlay network may not only send data packets to peers of virtual overlay networks belonging to the same tenant network, but may also send data packets to peers of virtual overlay networks belonging to different tenant networks and/or peers located in un-trusted zones (e.g. the Internet). In some instances, a distributed gateway associated with a source tenant end point may not have one or more network service functions (e.g. firewall) needed to treat a data packet in order to route the data packet to a destination virtual overlay network. As such, the distributed gateway may obtain and implement a service chain policy to forward the data packet to another network node (e.g. a network node that has a firewall) that is capable of handling one or more network service functions used to route the data packet across zones or tenant/virtual networks. The service chain policies may be distributed to the distributed gateways, NVEs, default gateways, and/or other network nodes such that a data packet may be forwarded in a designated sequence of nodes to receive network service function processing prior to forwarding the packet to the destination tenant end point.

Figure 1:
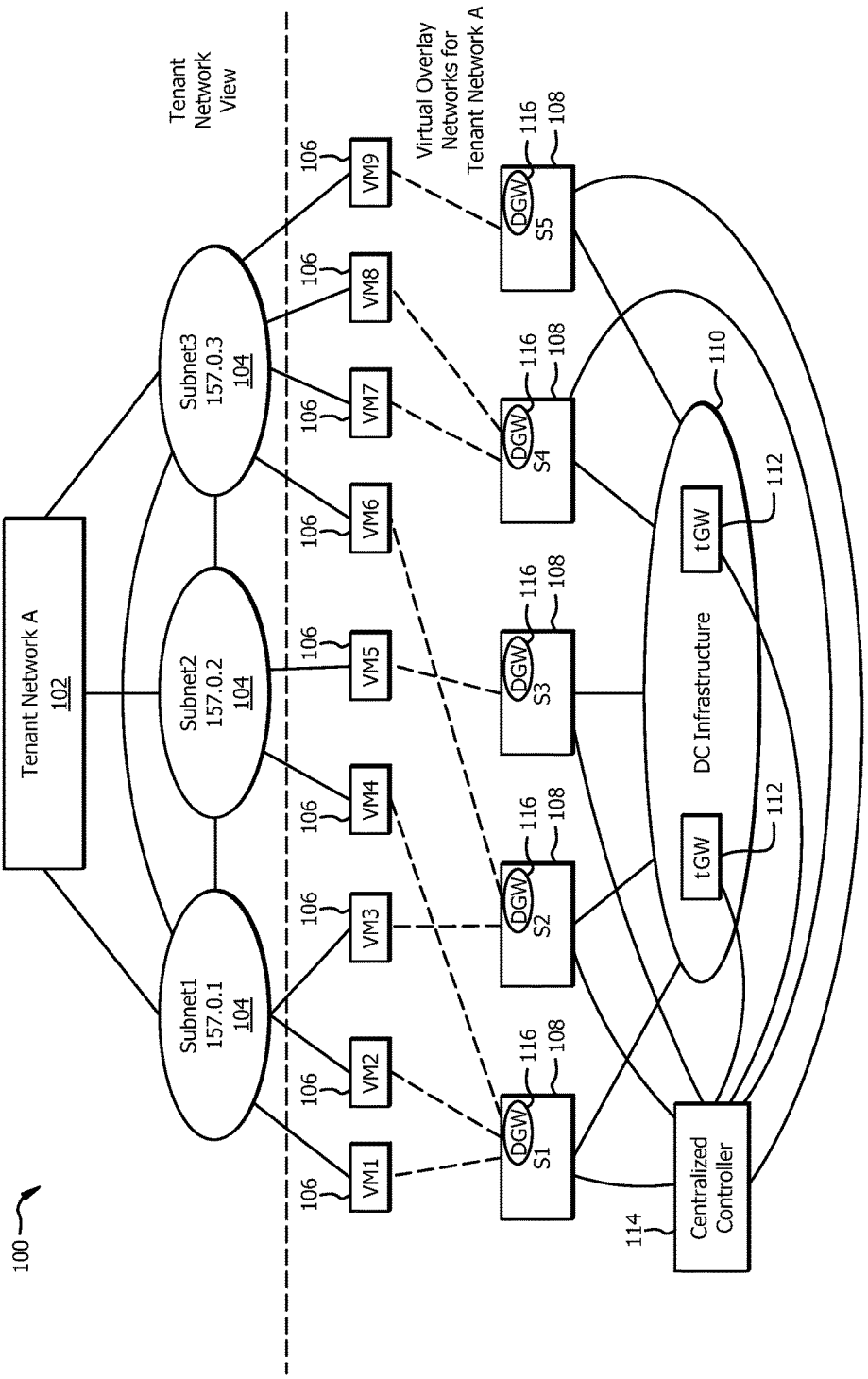
FIG. 1 is a schematic diagram of an example embodiment of a DC system where embodiments of the present disclosure may operate.

FIG. 1 is a schematic diagram of an example embodiment of a DC system 100 where embodiments of the present disclosure may operate. The DC system 100 may comprise one or more tenant networks 102 built on top of a DC infrastructure 110. The DC infrastructure 110 may comprise a plurality of access nodes (e.g. top of rack (ToR) switches), aggregation routers, core routers, gateway routers, switches, and/or any other network device used to route data within the DC system 100. The DC infrastructure 110 may also provide connectivity among servers 108 and/or to other external networks (e.g. Internet and/or VPN access) located outside of DC system 100. One or more tenant networks 102 may be supported by the DC infrastructure 110. Each of the tenant networks 102 may be a network that is decoupled from the DC infrastructure 110, but may rely on the DC infrastructure 110 to transport traffic. Each of the tenant networks 102 may be associated with its own set of tenant end points using the common DC infrastructure 110. In one example embodiment, each tenant network 102 may be configured with different default routing and/or gateway media access control (MAC) addresses for security concerns.

Each of the tenant networks 102 may comprise one or more virtual overlay networks. The virtual overlay network may provide Layer 2 (L2) and/or Layer 3 (L3) services that interconnect the tenant end points. FIG. 1 illustrates that DC system 100 may comprise a tenant network A 102 that is divided into three different virtual overlay networks, subnet network 1 104, subnet network 2 104, and subnet network 3 104, which are collectively referred to as subnet networks 1-3 104. In other words, subnet networks 1-3 104 may be virtual overlay networks supported by the DC infrastructure 110 and used to form tenant network A 102. Subnet networks 1-3 104 may have independent address spaces, independent network configurations, and traffic isolation between each other. The virtual overlay networks may be configured such that to forward data traffic from one virtual overlay network to another virtual overlay network, the data traffic may pass through one or more network service functions. Using FIG. 1 as an example, data traffic forwarded from subnet network 1 104 to subnet network 2 104 may need to pass through a firewall "A" network service function, and data traffic forwarded from subnet network 2 104 to subnet network 3 104 may need to pass through a firewall "B" network service function. Additionally, data traffic forwarded from subnet network 2 104 to subnet network 1 104 may have no network service function requirement, and no data traffic may be forwarded between subnet network 1 104 and subnet network 3 104.

Tenant end points may include VMs 106, hosts, virtual containers, and/or any other type of end nodes used to originate and receive data to and from a virtual overlay network, such as subnet networks 1-3 104. Each of the tenant end points may be assigned to one of the subnet networks 104. As shown in FIG. 1, VMs 1-3 106 are assigned to subnet network 1 104, VMs 4 and 5 106 are assigned to subnet network 2 104, and VMs 6-9 are assigned to subnet network 3 104. Subnet network 1 104 may be assigned an address of 157.0.1, subnet network 2 104 may be assigned an address of 157.0.2, and subnet network 3 104 may be assigned an address of 157.0.3.

When tenant end points, such as VMs 106, are created and implemented on servers 108, servers 108 may be configured to provide communication for tenant end points located on the servers 108. A virtual switching node, such as a virtual switch and/or router, can be created to route traffic amongst the tenant end points within a single server 108. The tenant end points within a server 108 may belong within the same virtual overlay network and/or a different virtual overlay network. Using FIG. 1 as an example, server S1 108 hosts VMs 1, 2, and 4 106. VMs 1 and 2 106 belong to subnet network 1 104 and VM 4 106 belongs to subnet network 2 104. In one example embodiment, a virtual switching node within server 1 108 may route traffic between VMs 1, 2, and 4 106, even though VM 4 106 is located within a different subnet network 104 than VMs 1 and 2 106.

Each of the servers 108 may also comprise an NVE to communicate with tenant end points within the same virtual overlay network, but located on different servers 108. An NVE may be configured to support L2 forwarding functions, L3 routing and forwarding functions, and support address resolution protocol (ARP) and/or neighbor discovery (ND) functions. The NVE may encapsulate traffic within a tenant network 102 and transport the traffic over a tunnel (e.g. L3 tunnel) between a pair of servers 108 or via a peer to multi-point (p2mp) tunnel for multicast transmission. The NVE may be configured to use a variety of encapsulation types that include, but are not limited to virtual extensible local area network (VXLAN) and Network Virtualization using Generic Routing Encapsulation (NVGRE). The NVE may be implemented as part of the virtual switching node (e.g. a virtual switch within a hypervisor) and/or as a physical access node (e.g. ToR switch). In other words, the NVE may exist within the server 108 or as a separate physical device (e.g. ToR switch) depending on the application and DC environments. In addition, the NVE may be configured to ensure the communication policies for the tenant network 102 are enforced consistently across all the related servers 108.

The DC system 100 may also comprise a plurality of default gateways 112 designated for tenant network A 102. The default gateways 112 may be a virtual network node (e.g. implemented on a VM 106) or a physical network device (e.g. physical gateway node). FIG. 1 illustrates that the default gateways 112 are physical network devices located within the DC infrastructure 110. The default gateways 112 may be any node that relays traffic onto and off of a virtual overlay network using treatment policies. For example, default gateways 112 may store an address mapping table used to map and forward traffic from one virtual overlay network to another virtual overlay network. Additionally, the default gateways 112 may also have a mapping table that forwards traffic between one virtual overlay network to another type of virtual network (e.g. L2 VLAN) and/or networks external to the DC system 100 (e.g. Internet). The default gateways 112 may also be configured to store the treatment policies, authentication protocols, security protocols that include, but are not limited to firewall, Intrusion Prevention System (IPS), load balancing, and security checking. The default gateways 112 may be configured to implement the treatment policies to communicate with virtual overlay networks located in another tenant network 102 not shown in FIG. 1 (e.g. a tenant network B) and/or other networks located outside of DC system 100 (e.g. the Internet and/or VPN access). In one example embodiment, the default gateways 112 may store all of the treatment policies used to forward data traffic between two virtual overlay networks within the same and different tenant networks, and to forward data traffic to a network external to DC system 100.

One or more distributed gateways 116 may be distributed within each of the tenant networks 102. FIG. 1 illustrates that each of the servers 108 may comprise a distributed gateway 116 located within a NVE. In one example embodiment, a distributed gateway 116 may be located on every NVE that participates within the subnet networks 1-3 104 for tenant network A 102. Establishing and implementing distributed gateways 116 to perform inter-network forwarding is described in more detail in U.S. patent application Ser. No. 14/180,636, filed Feb. 14, 2014 by Lucy Yong et al. and entitled "Distributed Gateway in Virtual Overlay Networks," which is incorporated herein by reference as if reproduced in its entirety. In one example embodiment, the distributed gateway 116 within the NVEs may act as L3 distributed gateways that are configured to perform L3 forwarding when routing data traffic between two virtual overlay networks.

A tenant end point (e.g. VM 1 106) participating in a virtual overlay network may send out an address resolution request (e.g. ARP and/or ND request) to determine a default gateway address. In one example embodiment, a distributed gateway 116 may subsequently intercept the address resolution request and respond back to the tenant end point with a designated distributed gateway address as the default gateway address. Afterwards, a distributed gateway 116 may receive traffic from the tenant end point and perform inter-network forwarding to route traffic between the two virtual overlay networks. In instances where the distributed gateway 116 does not store the inter-network forwarding policy, the distributed gateway 116 may forward data traffic to the default gateway 112 for inter-network based forwarding and policy checking.

In another example embodiment, a distributed gateway 116 may not interfere with the address resolution request used to map the default gateway address (e.g. mapping the default gateway's IP address to the default gateway MAC address). The tenant end points may receive responses from their default gateway 112 when the tenant end points send out the address resolution requests. Instead of directly responding to the address resolution requests, the distributed gateways 116 may snoop the address resolution requests to cache the address mapping of the default gateway 112. Alternatively, the distributed gateways 116 may obtain default gateway address mapping from the centralized controller 114, such as SDN controller and/or a management entity.

The distributed gateway 116 may subsequently intercept data frames that comprise a destination addresses that matches the default gateway's address (e.g. MAC address of the default gateway) and are destined for a virtual overlay network that is listed as a routable virtual overlay network. If the destination tenant end point is locally attached, then the distributed gateway 116 may route the data frame as if it is the default gateway 112. The distributed gateway 116 may determine whether a destination tenant end point is locally attached by inspecting the inner destination IP attached within the data packet. The distributed gateway 116 may forward the data packet to the destination tenant end point, where the data packet may comprise a destination MAC address field that identifies the destination tenant end point and a source MAC address field that identifies the default gateway 112 to avoid policy checking errors and/or address mapping errors (e.g. MAC to IP address learning or vice versa). For instance, when implementing IPS checking, the IPS checking may check the source MAC address within the data packet. If the destination tenant end point is not locally attached, the distributed gateway 116 may forward the data frame to the default gateway 112.

A common distributed network address, such as a distributed gateway MAC address, may be designated for the distributed gateways 116. In other words, the distributed gateways 116 may be assigned the same distributed network address. By assigning a common distributed network address for the distributed gateways 116, a tenant end point may not need to update the distributed network address within memory (e.g. cache memory) when the tenant end point moves from one server 108 to another server 108. Moreover, each of the distributed gateways 116 may participate in at least some of the virtual overlay networks within a tenant network 102.

The distributed gateways 116 may obtain inter-network forwarding policies from a default gateway 112, a centralized controller 114 (e.g. SDN controller), an authoritative entity, or some other management entity. The distributed gateway 116 may be configured to have some of the inter-network forwarding policies used to forward data traffic across different virtual overlay networks. The distributed gateways 116 may be able to route data traffic across different virtual overlay networks when the source tenant end point and destination end point are attached to the distributed gateway 116. For example, the distributed gateway 116 within server 1 108 may support forwarding data traffic from VM 1 106, which is located in subnet network 1 104, to VM 4 106, which is located in subnet 2 104. However, the distributed gateway 116 within server 1 108 may be unable to forward data traffic from VM 1 106 to VM 5 106, which is located in subnet network 2 104, because VM 5 106 is not attached to the distributed gateway 116 within server 1 108. In this instance, the distributed gateway 116 within server 1 108 may forward the data traffic to one of the default gateways 112, and the default gateway 112 may route the data traffic to VM 5 106.

In one example embodiment, the distributed gateways 116 may also obtain at least some of the network service functions from a default gateway 112, a centralized controller 114 (e.g. SDN controller), and/or some other management entity. The network service functions may include, but are not limited to network services, such as firewall, IPS, load balancing, security checking, and network address translation (NAT). Network service functions may be any service function that applies some kind of treatment to data packets that include, but are not limited to "drop/pass" treatment, "optimization" treatment, and/or "Attack analysis" treatment. A wide range of service functions may be used to route data packets. Network service functions may be attached to distributed gateways 116, NVEs, default gateways 112, and/or network service appliances within DC system 100, or embedded within those network nodes as treatment policies/capabilities. For convenience purposes, throughout this disclosure, the term "network node supports network service functions" will generally refer to service functions attached to the network node (e.g. NVEs) and/or to treatment policies/capabilities that are embedded within the network node. The network service appliances may be a virtual device implemented on a general purpose server, such as server 108, and/or a physical network device, such as a physical firewall network service appliance.

Each of the distributed gateways 116 may also obtain service chain policies from the centralized controller 114 and/or some other management entity. The service chain policies may be one or more rules used to determine the one or more network nodes to forward data traffic because those network nodes support (e.g. network service functions are attached and/or embedded) the network service functions to treat the packets themselves. In other words, the service chain policies may be configured to identify a single network node that have all of the network service functions or identify a set of network nodes, when combined, have all of the network service functions to properly route a data packet. For example, the distributed gateways 116 may each have a treatment policy that comprises the following generic rules:

Rule 1: Allowed Virtual Overlay Networks: {Virtual Overlay Network 1 prefix, Virtual Overlay Network 2 prefix, . . . }

Rule 2: Service chain policy: {all except Allowed Virtual Overlay Networks are sent to network node X}

Rule 1 of the treatment policy may identify which virtual overlay networks the distributed gateway 116 has the proper inter-network forwarding policies and network service functions to route the data traffic. In other words, the distributed gateway 116 may route the data traffic if both the source tenant end point and the destination tenant end point participate in virtual overlay networks found within the "Allowed Virtual Overlay Networks" list. Rule 2 of the treatment policy may be the service chain policy that identifies the network node (e.g. NVE IP or MAC address) to forward the data traffic to for un-allowed virtual overlay networks. Rule 2 applies when the source tenant end point, the destination tenant end point, or both participate in un-allowed virtual overlay networks or virtual overlay networks not found within the "Allowed Virtual Overlay Networks" list. Additionally, when Rule 2 applies, the distributed gateway 116 may not have access to the network service functions to route the data traffic between the source tenant end point and the destination tenant end point. Network node X may be a network node, such as the default gateway 112, an NVE within a server 108, and/or a network service appliance that has at least one of the network service functions used to route data traffic to the destination tenant end point. Distributing and implementing service chain policies for distributed gateways 116 will be discussed in more detail below.

As persons of ordinary skill in the art are aware, although FIG. 1 illustrates network virtualization overlay for a DC network, the disclosure is not limited to that application. For instance, embodiments of the present disclosure may be applicable to other network environments in addition to the NVO3 environment, such as VLAN, L2-VPN (e.g. Ethernet-VPN (E-VPN)), and/or L3-VPN (e.g. IP-VPN). Additionally, although the disclosure uses the terminology "distributed gateway," the terminology "distributed gateway" may be interchangeable with the other terminology that include, but are not limited to "pseudo gateway," "proxy gateway," and/or "L3 proxy gateway." The use and discussion of FIG. 1 is only an example to facilitate ease of description and explanation.

Figure 2:
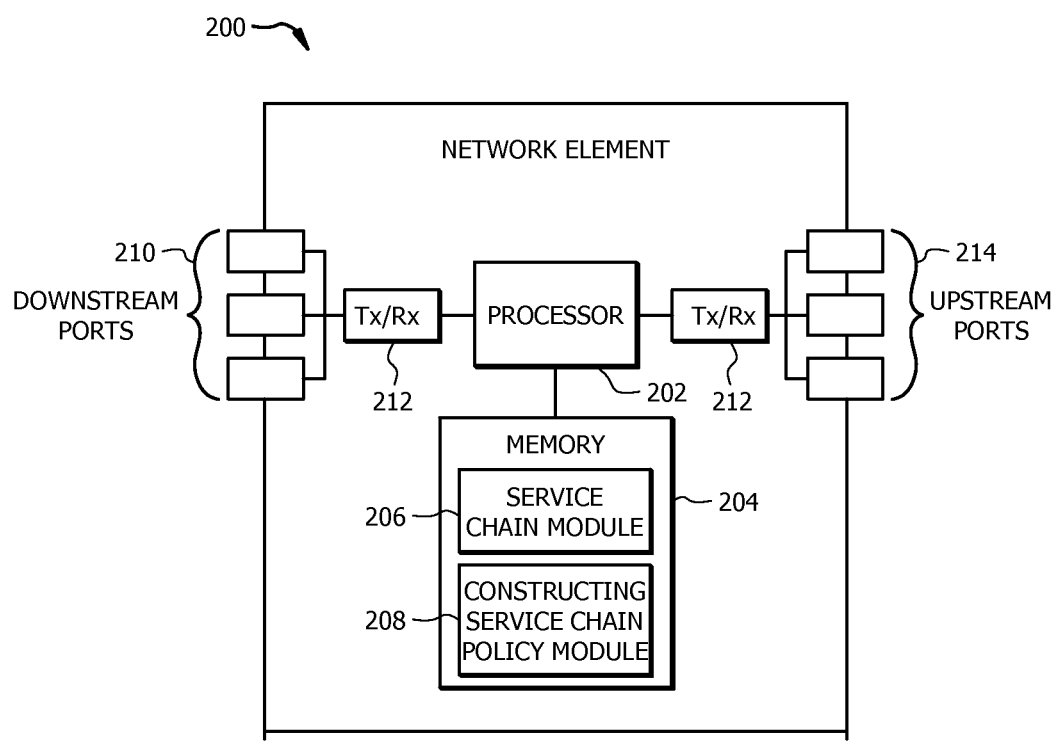
FIG. 2 is a schematic diagram of an embodiment of a network element that may be used to implement service chain policies.

At least some of the features/methods described in the disclosure may be implemented in a network element. For instance, the features/methods of the disclosure may be implemented using hardware, firmware, and/or software installed to run on hardware. FIG. 2 is a schematic diagram of an embodiment of a network element 200 that may be used to implement a service chain policy on a distributed gateway, a default gateway, a centralized controller, and/or a network service appliance. In other words, the network element 200 may be any apparatus and/or network node used to obtain, store, construct, distribute and/or use service chain policies to route data packets between at least two or more virtual overlay networks. For example, network element 200 may be a distributed gateway implemented on an NVE located on a server or on a separate access node (e.g. ToR switch).

The network element 200 may comprise one or more downstream ports 210 coupled to a transceiver (Tx/Rx) 212, which may be transmitters, receivers, or combinations thereof. The Tx/Rx 212 may transmit and/or receive frames from other network nodes via the downstream ports 210. Similarly, the network element 200 may comprise another Tx/Rx 212 coupled to a plurality of upstream ports 214, wherein the Tx/Rx 212 may transmit and/or receive frames from other nodes via the upstream ports 214. The downstream ports 210 and/or upstream ports 214 may include electrical and/or optical transmitting and/or receiving components.

A processor 202 may be coupled to the Tx/Rx 212 and may be configured to process the frames and/or determine which nodes to send (e.g. transmit) the frames. In one embodiment, the processor 202 may comprise one or more multi-core processors and/or memory modules 204, which may function as data stores, buffers, etc. The processor 202 may be implemented as a general processor or may be part of one or more application specific integrated circuits (ASICs) and/or digital signal processors (DSPs). Although illustrated as a single processor, the processor 202 is not so limited and may comprise multiple processors. The processor 202 may be configured to implement any of the schemes described herein, including methods 700 and 800.

FIG. 2 illustrates that the memory module 204 may be coupled to the processor 202 and may be a non-transitory medium configured to store various types of data. Memory module 204 may comprise memory devices including secondary storage, read only memory (ROM), and random access memory (RAM). The secondary storage is typically comprised of one or more disk drives, solid-state drives (SSDs), and/or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 204 may be used to house the instructions for carrying out the system and methods described herein, e.g. method 700 implemented at distributed gateway 116. In one example embodiment, the memory module 204 may comprise a service chain module 206 that may be implemented on the processor 202. Alternately, the service chain module 206 may be implemented directly on the processor 202. The service chain module 206 may be configured to obtain, store, and use service chain policies to route traffic between two virtual overlay networks within the same or different tenant networks and/or to an external network. For example, the service chain module 206 may be used in distributed gateway 116 to obtain, store, and use Rule 1 and Rule 2 of the service chain policy that was discussed in FIG. 1. Functions performed by the service chain module 206 will also be disclosed in FIGS. 3-5 and 7. In another example embodiment, the memory module 204 may comprise a constructing service chain policy module 208 used to receive network function advertisement and construct the topology for a service chain policy. Using FIG. 1 as an example, the centralized controller 114 and distributed gateways 116 may comprise the constructing service chain policy module 208. Functions performed by the constructing service chain policy module 208 will also be disclosed in FIGS. 6 and 8.

It is understood that by programming and/or loading executable instructions onto the network element 200, at least one of the processor 202, the cache, and the long-term storage are changed, transforming the network element 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
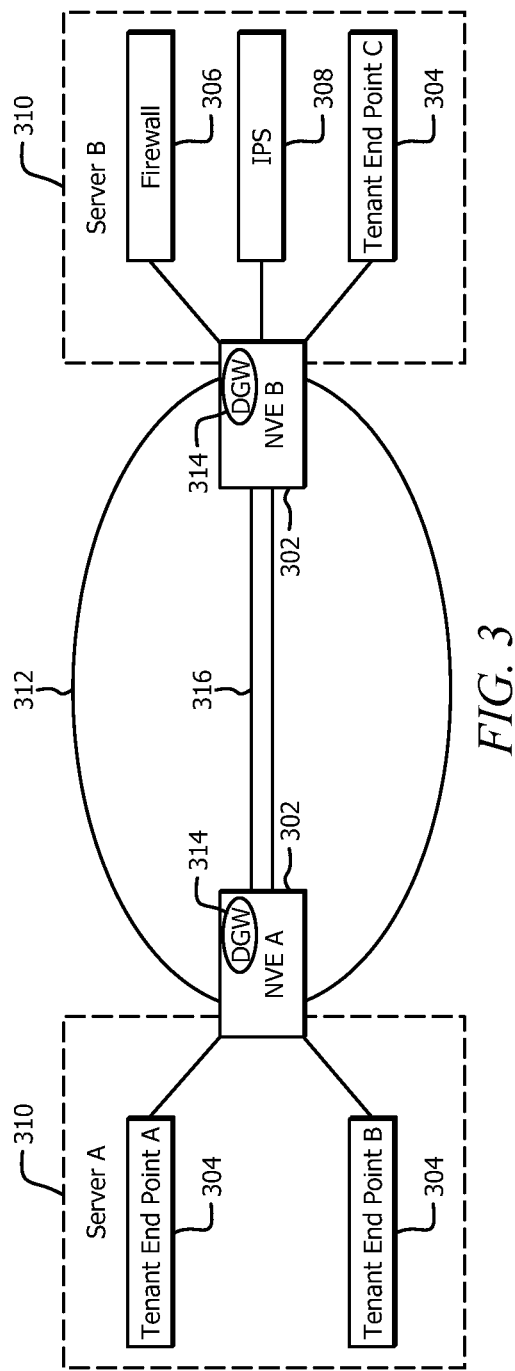
FIG. 3 is a schematic diagram of an example embodiment of a DC system where the destination server hosts the network service functions used to route data traffic.

FIG. 3 is a schematic diagram of an example embodiment of a DC system 300 where the destination server 310 hosts the network service functions used to route data traffic. The DC system 300 may comprise NVEs A and B 302, tenant end points A-C 304, a firewall 306, an IPS 308, and a DC infrastructure 312. The servers A and B 310 and DC infrastructure 312 are substantially similar to the servers 1-5 108 and DC infrastructure 110 as described in FIG. 1, respectively. In addition, the NVEs A and B 302 and tenant end points A-C 304 are substantially similar to the NVEs and tenant end points as discussed in FIG. 1. As shown in FIG. 3, NVEs A and B 302 may comprise distributed gateways 314, which are substantially similar to the distributed gateways 116 described in FIG. 1.

FIG. 3 illustrates that NVE A 302 and tenant end points A and B 304 may be located on server A 310, and NVE B 302, tenant end point C 304, firewall 306, and IPS 308 may be located on server B 310. Tenant end points A-C 304 may be located on one or more virtual overlay networks. The virtual overlay networks may be located within the same tenant network and/or different tenant networks. Using FIG. 3 as an example, tenant end point A 304 may be located on virtual overlay network X, and tenant end point B and C 304 may be located on a virtual overlay network Y. Virtual overlay network X may be located within a tenant network A and virtual overlay network Y may be located within a tenant network B. Alternatively, virtual overlay networks X and Y may be both located within tenant network A or tenant network B.

In FIG. 3, NVE A 302 may receive a data packet from tenant end point A 304 that is destined for tenant end point C 304, which is attached to NVE B 302. Tenant end point A 304 may be located in virtual overlay network X and tenant end point C 304 may be located in virtual overlay network Y. To forward the data packet from virtual overlay network X to virtual overlay network Y, one or more network service functions, such as a firewall and an IPS network service function may need to process the data packet prior to sending the data packet to tenant end point C 304. FIG. 3 illustrates that server B 310 hosts all of the corresponding network service functions used to route the data packet to virtual overlay network Y. Specifically, server B 310 hosts the firewall network service function within firewall 306 and the IPS network service function within IPS 308. Although FIG. 3 illustrates that server B 310 hosts the network service functions, other embodiments may have server A 310 hosting at least one of the network service functions used to route the data packet to virtual overlay network Y.

When NVE A 302 receives the data packet from tenant end point A 304, NVE A 302 may determine that server A 310 does not have all of the network service functions to route the data packet to tenant end point C 304. NVE A 302 or the distributed gateway 314 may obtain (e.g. query the service chain policy from a centralized controller, an authoritative entity, or some other management entity) or have a service chain policy that identifies NVE B 302 as the forwarding service chain node. For example, the distributed gateway 314 within the NVE A 302 may have the following rule within a treatment policy to route data traffic from virtual overlay network X to virtual overlay network Y:
  Rule 1: Allowed Virtual Overlay Networks: {Virtual Overlay Network A prefix, Virtual Overlay Network B prefix}
  Rule 2: Service chain policy: {all except Allowed Virtual Overlay Networks is sent to NVE B 302}
When NVE A 302 receives the data packet, NVE A 302 may perform an IP table lookup to determine that the destination virtual overlay network is virtual overlay network Y. NVE A 302 may replace the destination virtual network field within the data packet with a virtual network identifier (VN ID) that identifies virtual overlay network Y. Based on the service chain policy, NVE A 302 may also obtain and encapsulate the address of NVE B 302 within an outer header and subsequently forward the data packet via overlay tunnel 314 to NVE B 302.

After the data packet reaches NVE B 302, NVE B 302 may de-encapsulate the packet to remove the outer header that contains the address of NVE B 302 and inspect the remaining data packet to implement a service chain policy. The NVE B 302 or distributed gateway 314 may obtain (e.g. query the service chain policy from a centralized controller) or use a previously stored service chain policy that includes a list of criteria, such as the destination address of the tenant end point, the destination virtual overlay network, the source address of the tenant end point, port information, and/or other data packet information to determine what network service functions are used to process the data packet.

The NVE B 302 may use the service chain policy to determine how to forward and process the data packet. In FIG. 3, the NVE B 302 or distributed gateway 314 may have the following rules within a service chain policy to route data traffic from virtual overlay network X to virtual overlay network Y:
  Service chain rule 1: {Destination Virtual Overlay Network Y prefix is sent to firewall 306}
  Service chain rule 2: {Data packet received from firewall 306 is sent to IPS 308}
  Service chain rule 3: {Data packet received from IPS 308 is sent to tenant end point C 304}
When NVE B 302 initially receives the data packet from NVE A 302, NVE B 302 may use service chain rule 1 to determine that the received data packet may need to be initially processed at firewall 306. NVE B 302 may subsequently encapsulate the address of firewall 306 to the data packet and forward the data packet to be treated at firewall 306. After processing the data packet, firewall 306 may return the data packet to NVE B 302. NVE B 302 may then implement service chain rule 2 and subsequently encapsulate the address of IPS 308 to the packet and forward the data packet to be treated at IPS 308. IPS 308 may then return the data packet to NVE B 302 and NVE B 302 may implement service chain rule 3 and forward the data packet to the destination tenant end point C 304 using an inner destination address that identifies tenant end point C 304 (e.g. destination MAC address).

Figure 4:
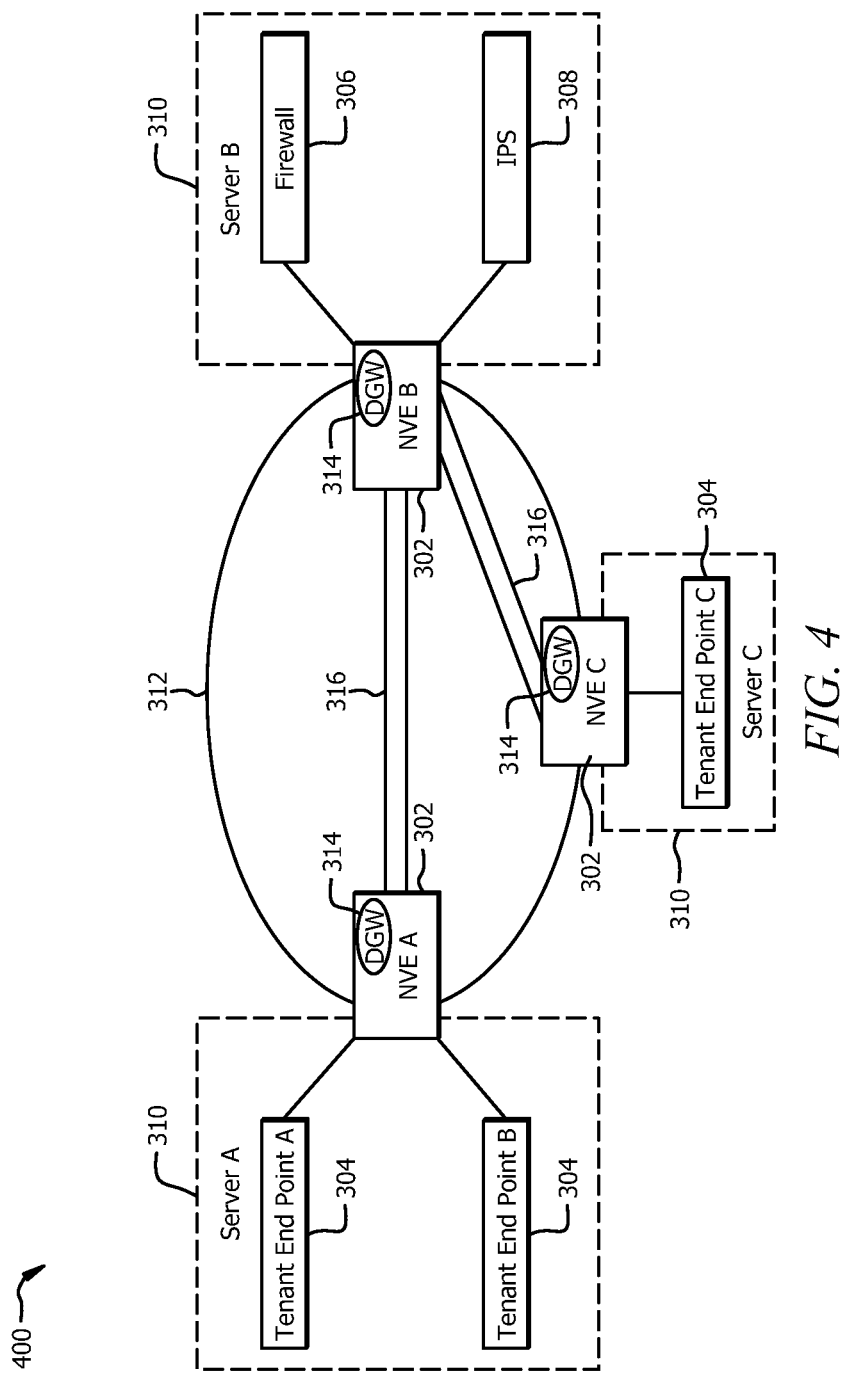
FIG. 4 is a schematic diagram of an example embodiment of a DC system where the destination server does not host the network service functions.

FIG. 4 is a schematic diagram of an example embodiment of a DC system 400 where the destination server 310 does not host the network service functions. Recall that one or more network nodes (e.g. a firewall hosted by another server) may be capable of supporting different network service functions on behalf of a distributed gateway 314. In contrast to FIG. 3, FIG. 4 illustrates that the destination server C 310 that hosts tenant end point C 304 does not host firewall 306 and IPS 308. If server A 310 and/or server C 310 host all of the network service functions used to route the data packet from tenant end point A 304 to tenant end point C 304, then NVE A 302 may directly forward the data packet to NVE C 302 via overlay tunnel 316. Conversely, if server A 310 and/or server C 310 do not host all of the network service functions (e.g. hosts none or some of the network service functions) to route the data packet, the data packet may be sent to another network node, such as NVE B 302 for network service function processing of the data packet. Although FIG. 4 illustrates that a server 310 hosts the network service functions, other example embodiments of DC system 400 may have the network service functions located on other types of network nodes, such as a default gateway as described in FIG. 1 and/or network service appliances.

When server A 310 and/or server C 310 do not host all of the network service functions to route the data packet, the NVE A 302 or the distributed gateway 314 within NVE A 302 may obtain (e.g. by querying the inter-network forwarding policy from a centralized controller) or use a pre-existing service chain policy that identifies NVE B 302 as the forwarding service chain node. After NVE A 302 receives the data packet and based on the service chain policy, NVE A 302 may determine and encapsulate the address of NVE B 302 within an outer header and subsequently forward the data packet via overlay tunnel 316 to NVE B 302. After the data packet reaches NVE B 302, NVE B 302 may de-encapsulate the packet to remove the outer header that contains the address of NVE B 302 and inspect the remaining data packet to implement the service chain policy.

In FIG. 4, the NVE B 302 may use the service chain policy to determine how to forward and process the data packet. For example, NVE B 302 may have the following rules within a service chain policy to route data traffic from virtual overlay network X to virtual overlay network Y:
  Service chain rule 1: {Destination Virtual Overlay Network Y prefix is sent to firewall 306}
  Service chain rule 2: {Data packet received from firewall 306 is sent to IPS 308}
  Service chain rule 3: {Data packet received from IPS 308 is sent to NVE C 302}
Service chain rule 1 and 2 are substantially similar to the service chain rules 1 and 2 discussed in FIG. 3. After IPS 308 returns the data packet to NVE B 302, NVE B 302 may implement service chain rule 3 and encapsulate the address of NVE C 302 to the packet and forward the data packet to NVE C 302 via overlay tunnel 316. Once NVE C 302 receives the data packet, NVE C 302 may then de-encapsulate the outer header that includes the address of NVE C 302 and forward the data packet to the destination tenant end point C 304 using an inner destination address that identifies tenant end point C 304 (e.g. destination MAC address).

Figure 5:
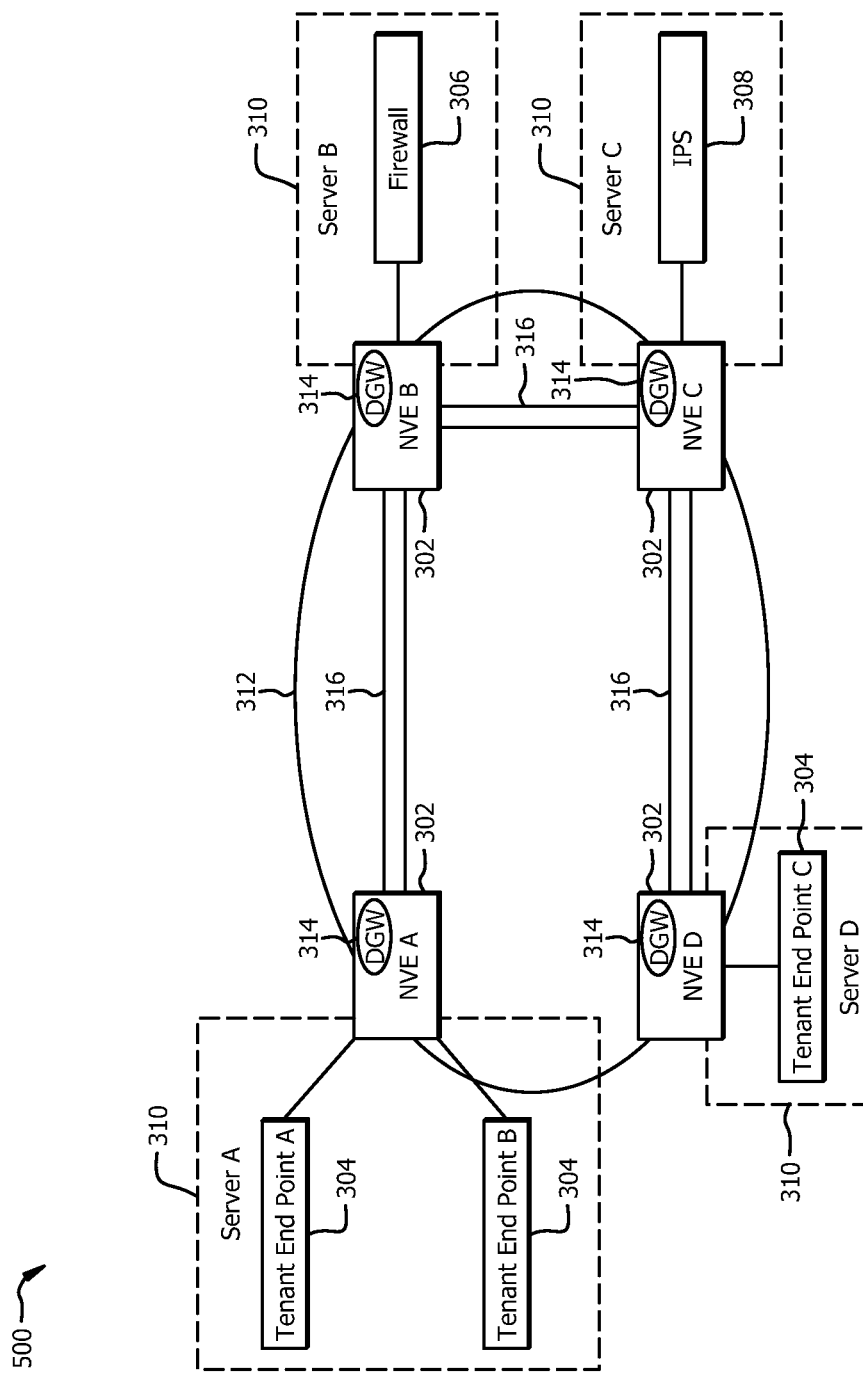
FIG. 5 is a schematic diagram of an example embodiment of a DC system where a plurality of servers host the network service functions.

FIG. 5 is a schematic diagram of an example embodiment of a DC system 500 where a plurality of servers 310 host the network service functions. A data packet may be forwarded to a plurality of network nodes located on different servers 310 to form a service chain prior to forwarding the data packet to the destination tenant end point. In contrast to FIG. 4, firewall 306 and IPS 308 are located on different servers 310. Although FIGS. 4 and 5 illustrates that the data packet is forwarded to NVEs 302 prior to forwarding to the destination server 310, other types of network nodes, such as the default gateway as described in FIG. 1 and/or networks service appliances, may be used to process network service functions for the data packet.

In FIG. 5, when NVE A 302 receives a data packet from tenant end point A 304, NVE A 302 may forward the data packet based on a service chain policy to NVE B 302 via overlay tunnel 316. The service chain policy at NVE B 302 may determine that the data packet may be initially forwarded and processed at firewall 306. After NVE B 302 receives the data packet from firewall 306, the service chain policy may direct NVE B 302 to subsequently forward the data packet to NVE C 302 via overlay tunnel 316. The service chain policy at NVE C 302 may indicate that the data packet is forwarded to IPS 308 for treatment. After NVE C 302 receives the packet from IPS 308, NVE C 302 may forward the data packet to NVE D 302 via overlay tunnel 316. NVE D 302 may de-encapsulate the outer header used to forward the data packet via overlay tunnel 316 and forward the data packet to tenant end point C 304 based on the inner destination address that identifies tenant end point C 304 (e.g. destination MAC address). The service chain policies implemented at NVE A-C 302 may form a service chain of NVE A 302, NVE B 302, firewall 306, NVE C 302, IPS 308, and NVE D 302 used to route the data packet.

Figure 6:
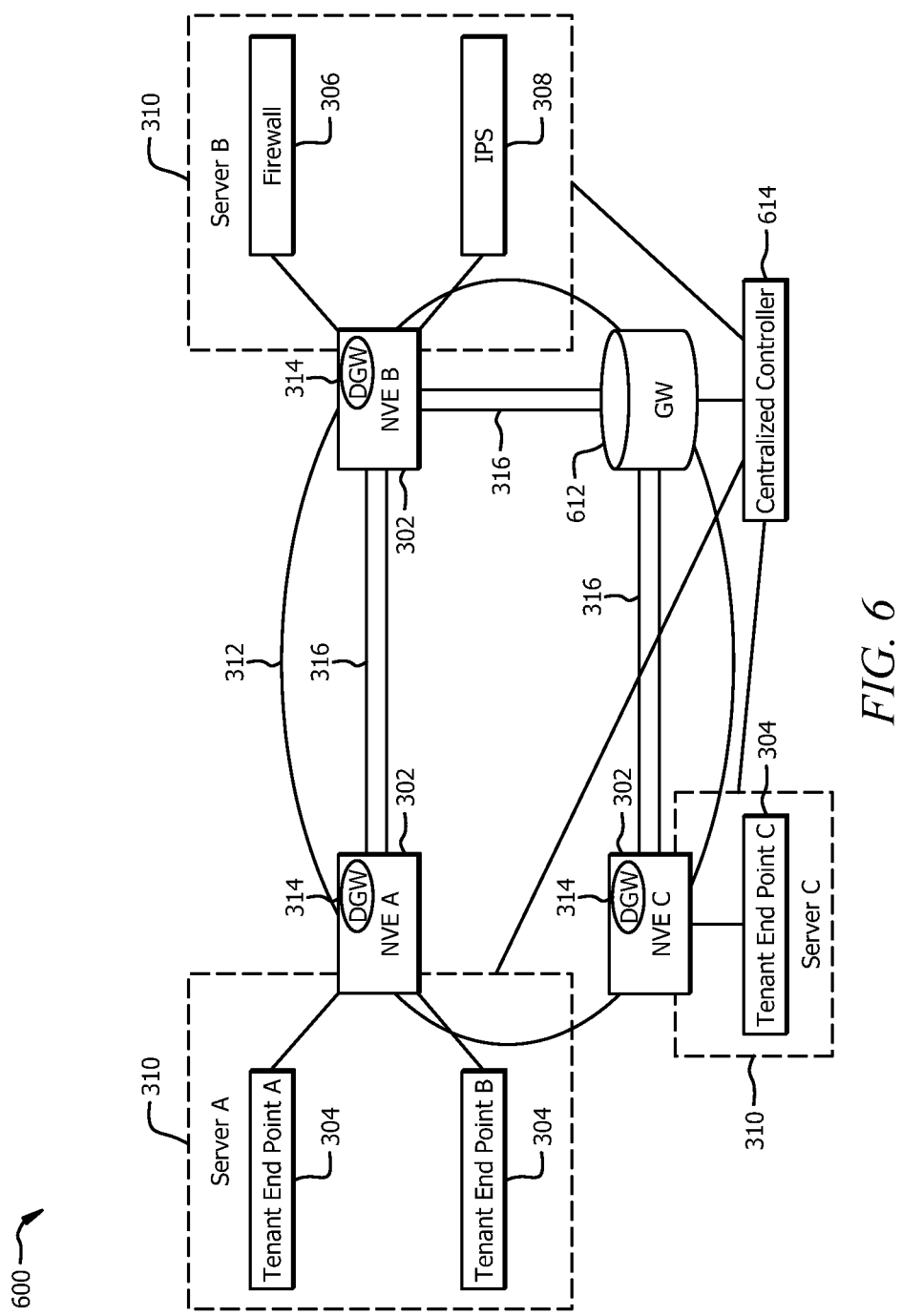
FIG. 6 is a schematic diagram of an example embodiment of a DC system that comprises a centralized controller to distribute service chain policies.

FIG. 6 is a schematic diagram of an example embodiment of a DC system 600 that comprises a centralized controller 614 to distribute service chain policies. The default gateway 612 and centralized controller 614 may be substantially similar to the default gateway 112 and centralized controller 114 as described in FIG. 1. The centralized controller 614 may be configured to communicate with servers A-C 310 and default gateway 612 in order to distribute service chain policies to the distributed gateways 314, NVEs 302, a default gateway 612, and/or other network nodes on the service chain. In another example embodiment, rather than obtaining the service chain policies from the centralized controller 614, each of the distributed gateways 314, NVEs 302, default gateway 612, and/or other network nodes may be configured to construct their own service chain policies by listening for advertisement messages from the network nodes. The service chain policies may be encoded into a data packet, similar to source routing, when service chain policies are not obtained from a centralized controller 614.

As shown in FIG. 6, one or more network nodes, such as firewall 306, IPS 308, and default gateway 612, may be capable of enforcing treatment policies used to forward data traffic across different virtual overlay networks on behalf of a distributed gateway 314. The virtual overlay networks may participate within the same tenant network and/or different tenant networks. The network nodes for any given virtual overlay network may advertise reachable virtual overlay network prefixes to the centralized controller 614. After receiving the advertisements, the centralized controller 614 may construct service chain policies based on the network service function topology. Although FIG. 6 illustrates that a centralized controller 614 may be used to distribute the service chain policies, other management entities may also be used to distribute the service chain policies.

Network nodes may advertise their network service function capability using an advertisement message. In one example embodiment, the advertisement message may be a link advertisement message for an Interior Gateway Protocol (IGP), such as Intermediate System to Intermediate System (IS-IS) and Open Shortest Path First (OSPF). Network nodes that could be on the service chains to handle network service functions on behalf of a distributed gateway 314 may advertise a link advertisement message that comprises a service chain type-length-value (TLV). The service chain TLV may contain information that advertises reachable virtual overlay network prefixes. The service chain TLV may comprise reachable virtual overlay network prefixes and the network service functions that are embedded and/or attached to the advertising network node. In another example embodiment, a separate service chain advertisement message using IGP may be used to advertise reachable virtual overlay network prefixes. The service chain TLV and/or the service chain advertisement message may provide the following information:

{Service Chain for Distributed Gateway: Yes/No}

The service chain TLV and/or service chain advertisement message may represent whether the network node may be part of the service chain for a specific distributed gateway 314. Using FIG. 6 as an example, the default gateway 612 may advertise using a link advertisement message that the default gateway 612 may be part of the service chain for the distributed gateway 314 within NVE A 302 to route data packets from virtual overlay network X to virtual overlay network Y.

In another example embodiment, for network nodes not configured to support IGP (e.g. a firewall service appliance or IPS service appliance), each of the network nodes may advertise the following information:

{Network Node Address, Function-List, virtual overlay network list}

The Network Node Address may identify the network node advertising the network service function advertisement. The Function-List may represent the type of network service functions performed by the advertising network node. In one embodiment, since there could be many types of service functions and the capability description for the service functions can be relatively long and complex, the service function capabilities can be represented by function identifiers within the Function-List. The function identifiers may be associated with attribute profiles defined by a centralized controller, an authoritative entity, an orchestration entity or some other management entity and dispatched to the NVEs 302 and/or distributed gateways 314. The virtual overlay network list may include virtual overlay network prefixes that represent what the advertising network node is responsible for.

After receiving advertisements from the network nodes, the centralized controller 614 may sort or categorize the network nodes into policy tiers. Based upon the received advertisement messages, the centralized controller 614 may determine hierarchical service chains and the network service function topology used to enforce the network service functions on behalf of the distributed gateways 314. The centralized controller 614 may construct a hierarchical policy system that assigns policy tiers to the network nodes. Using FIG. 6 as an example, the treatment policies on distributed gateways 314 (e.g. inter-network forwarding policies) may be assigned the lowest policy tier, firewall and IPS network service functions found in firewall 306 and IPS 308, respectively, may be assigned as an intermediate policy tier, and the default gateways 612 may be assigned the highest policy tier. Additionally, when the DC system 600 comprises a plurality of default gateways 612, a subset of the default gateways 612 may be assigned as the highest policy tier, while the remaining default gateways 612 may be assigned to lower policy tiers. By categorizing the network nodes into different policy tiers, data traffic may be efficiently routed for proper network service function policy treatment.

The centralized controller 614 may create service chain policies that correspond to the hierarchical service chain and network service function topology determined from the advertisement message. The service chain may identify a chain of network nodes that may be used to implement network service functions on behalf of a distributed gateway 314. After constructing the service chain policies, the centralized controller 614 may distribute the service chain policies to the distributed gateways 314, NVEs 302, and/or default gateway 612 to route data traffic using service chains.

The service chain policies may be distributed such that a data packet may be forwarded in a predetermined service chain. The predetermined service chain may be a sequence of network nodes or paths the data packet may traverse in order to reach a destination tenant end point (e.g. tenant end point C 304), where the network nodes have the network service functions to treat the data packet. Each of the service chain policies received by the distributed gateways 314, NVEs 302, and/or default gateway 612 identifies at least a portion of the service chain. For example, the service chain policy received by the distributed gateway 314 within NVE A 302 may reference the second network node in the sequence, NVE B 302. Once the second network node receives the data packet, the service chain policy received by the distributed gateway 314 within NVE B 302 may identify firewall 306 and IPS 308 for treating the data packet.

FIG. 6 illustrates that default gateway 612 may be part of the service chain to route a data packet from tenant end point A 304 to tenant end point C 304. The data packet may be forwarded to NVE B 302 from NVE A 302 to be treated at firewall 306 and IPS 308. Afterwards, NVE B 302 may forward the data packet to the default gateway 612 to be treated for other network service functions, such as load balancing, prior to forwarding the data packet to NVE C 302. Although the default gateway 612 may also store the firewall and IPS network service functions, the default gateway 612 may not treat the data packet for the firewall and IPS network service functions. By categorizing the default gateway 612 as the highest policy tier, the centralized controller 614 may designate network nodes with lower policy tiers (e.g. firewall 306 and IPS 308) to enforce the network service functions before designating the network nodes with higher policy tiers (e.g. default gateway 612) for a service chain policy.

In one example embodiment, when an E-VPN or some other L2-VPN is used to interconnect the NVEs 302, if the distributed gateway 314 within an NVE 302 performs inter-network forwarding, the NVE 302 may comprise a enhance network interface and may be configured to implement virtual routing and forwarding (VRF). VRF may be used to perform inter-network forwarding such that the NVE 302 does not need to populate IP routes to other NVEs 302, excluding default gateways 612. The route distribution for L2-VPN may be used to perform both intra and inter-subnet forwarding. If the DC system 600 uses Border Gateway Protocol (BGP) to distribute routes among NVEs 302, a router target may be used for controlling the distribution of routing information among the set of NVEs 302 that are members of a VPN. For a fully meshed closed user group, such as distributed gateways that are able to route all of the traffic, one route target can be created. For a hub-spoke structure, where a centralized gateway is used to route all of the traffic, two router targets can be used. At the VRFs attached to the hub sites, "Hub" is the Export Target and "Spoke" is the Import Target. At the VRFs attached to the spoke site, "Hub" is the Import Target and "Spoke" is the Export Target. In a hub-spoke structure, the centralized gateway may be the hub site and the tenant end points may be the "spoke" sites.

Additionally, within L2-VPN, some of the NVEs 302 may be configured to perform all of the inter-subnet forwarding, while other NVEs 302 may not. For the latter, the other NVEs 302 may forward inter-subnet traffic to default gateways 612 and rely on the default gateways 612 to implement the proper routing and forwarding policies. In this example embodiment, three router targets may be used, one router target as "full-mesh", one as "hub", and one as "spoke". The NVEs 302 configured with "full mesh" sites will export "full mesh" router target and import "full mesh" and "hub" router targets. The NVEs 302 configured with "spoke" sites will export "spoke" router target and import with "hub" router target, and the NVE 302 attached to a default gateway 612 may be configured with export "hub" router target, and import "full-mesh" and "spoke" targets. To forward intra-subnet traffic (e.g. as L2 forwarding) another "full-mesh-12" route target may be created for distributing the MAC routes.

Alternatively, an NVE 302 may perform inter-network forwarding for some virtual overlay networks but not others. In this example embodiment, one NVE 302 may be attached with multiple E-VPN instances that belong to the same tenant VPN and have multiple virtual overlay networks. The NVE 302 may have several tenant end points 304 that belong to different virtual overlay networks (e.g. E-VPN instances). Thus, an NVE 302 associated with some E-VPN instances may be configured with "full mesh" router target and other associated E-VPN instances may be configured with "spoke" router target. Other routing distribution topologies may be created for L2-VPN.

Figure 7:
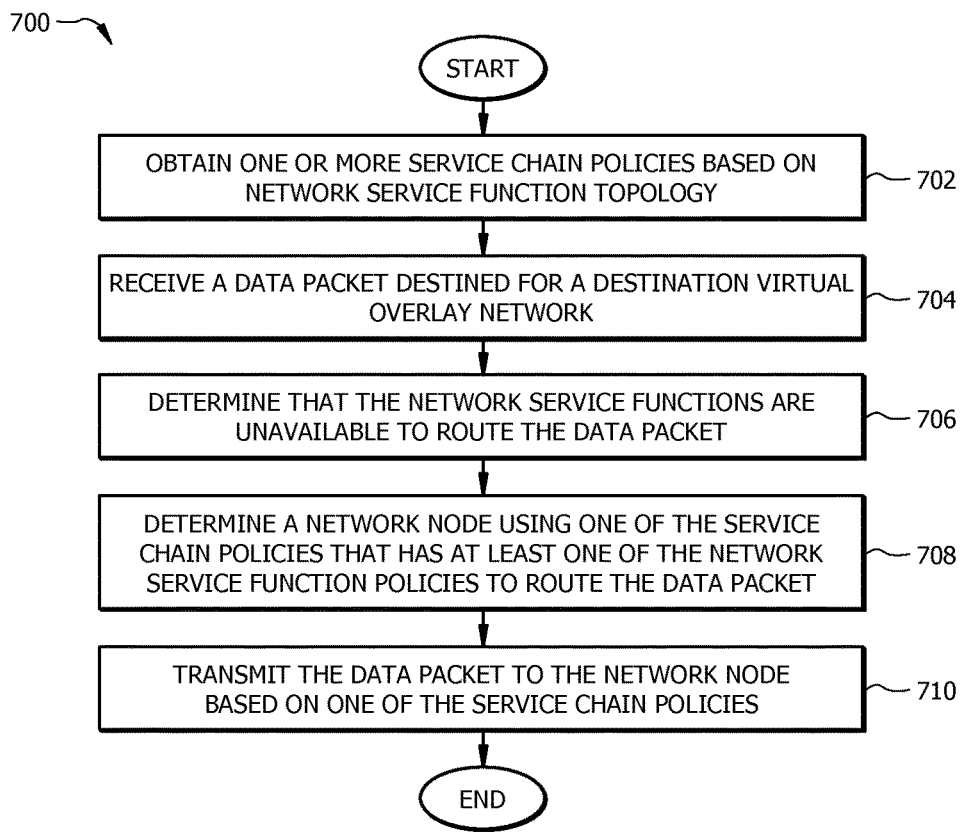
FIG. 7 illustrates a flowchart of an example embodiment of a method for routing data packets using a service chain policy.

FIG. 7 illustrates a flowchart of an example embodiment of a method 700 for routing data packets using a service chain policy. Method 700 may be implemented within a distributed gateway, an NVE, and/or a default gateway. Method 700 may start at block 702 and obtain one or more service chain policies based on network service function topology. Method 700 may obtain the service chain policies from a centralized controller or may construct the service chain policies from advertisements received from network nodes configured to perform network service functions. Method 700 may then move to block 704 and receive a data packet destined for a destination virtual overlay network. One or more network service functions may be used to route the data packet from the source virtual overlay network to the destination virtual overlay network. Method 700 may then move to block 706 to determine that the network service functions are unavailable to route the data packet. Method 700 may then move to block 708 to determine a network node, using one of the service chain policies that have at least one of the network service functions to route the data packet. Method 700 may move to block 710 to transmit the data packet to the network node based on one of the service chain policies. Afterwards, method 700 ends.

Figure 8:
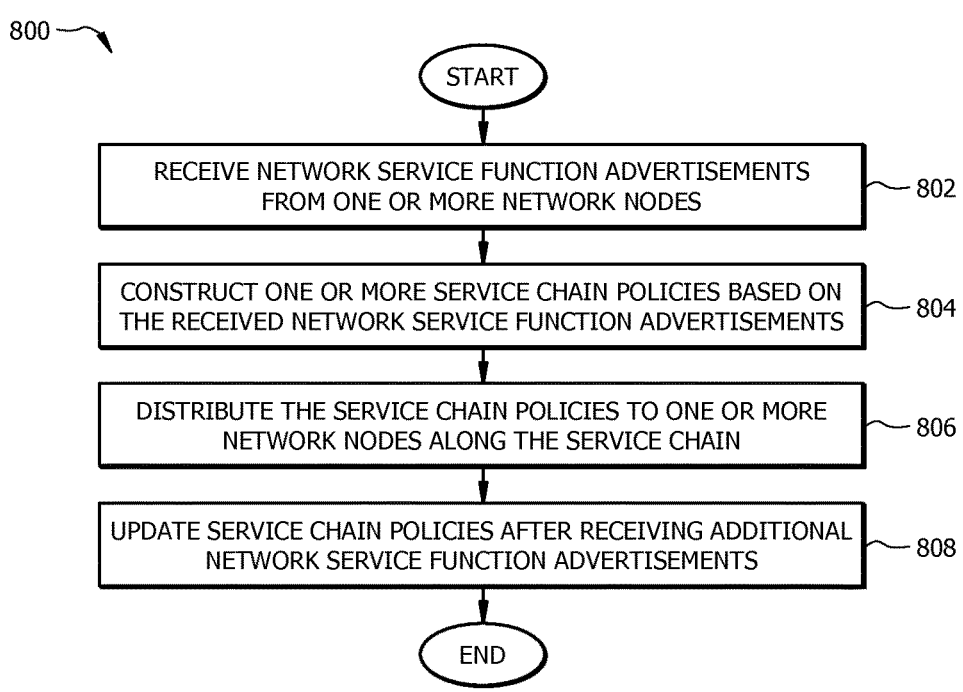
FIG. 8 illustrates a flowchart of an example embodiment of a method for distributing a service chain policy.

FIG. 8 illustrates a flowchart of an example embodiment of a method 800 for distributing a service chain policy. Method 800 may be implemented within a distributed gateway, an NVE, a default gateway, a centralized controller, and/or a management entity. Method 800 may start at block 802 and receive network service function advertisements from one or more network nodes. The network service function advertisements may comprise information as discussed above to advertise reachable virtual overlay network prefixes. Method 800 may then move to block 804 to construct one or more service chain policies based on the received network service function advertisements. Method 800 may then proceed to block 806 and distribute the service chain policies to one or more network nodes along the service chain. When method 800 is implemented within a centralized controller, at least a portion of the service chain is found within a service chain policy. When method 800 is implemented within a distributed gateway or NVE, the service chain policy may be distributed by encoding the service chain policy within the data packet being forwarded to the destination tenant end point, similar to source routing. Method 800 may continue to block 808 and update service chain policies after receiving additional network service function advertisements. Afterwards, method 800 ends.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. A method for implementing a service chain policy in a distributed gateway within a network, the method comprising:

configuring the network to use the distributed gateway;

sending a data packet with a distributed gateway address of the distributed gateway instead of a default gateway address as requested;

receiving, via a receiver, a data packet from a virtual overlay network using the distributed gateway address;

determining, via a processor coupled to the receiver, that the data packet needs to receive one or more policy treatments before forwarding the data packet to a destination end point;

determining, via the processor, that the distributed gateway does not have one or more of the policy treatments to forward the data packet to the destination end point;

determining, via the processor, one or more network nodes that provide the policy treatments;

sequencing, via the processor, the network nodes into the service chain policy;

encapsulating the data packet with an address of a first network node offering a first service in the service chain policy;

forwarding the data packet to the first network node sequenced in the service chain policy for application of the first service;

receiving the data packet back from the first network node after application of the first service to the data packet; and encapsulating the data packet with an address of a second network node offering a second service and forwarding the data packet to the second network node for application of the second service.

2. The method of claim 1, wherein the network nodes are determined and sequenced into the service chain policy based on communicating with an authoritative entity or a software defined network (SDN) controller.

3. The method of claim 1, wherein the service chain policy corresponds to a predetermined sequence to route the data packet amongst the network nodes.

4. The method of claim 3, wherein each of the network nodes provides a policy treatment by embedding the policy treatment in a received data packet or through a service function that apply the policy treatment to the received data packet.

5. The method of claim 1 further comprising receiving, via the receiver, a received advertisement that identifies an advertised policy treatment provided by a network node, wherein the received advertisement comprise a policy treatment identifier that identifies an attribute profile associated with the advertised policy treatment.

6. The method of claim 5, wherein determining the network nodes that provide the policy treatments is based upon the received advertisement.

7. The method of claim 6, wherein the received advertisement is received from a management entity.

8. The method of claim 7 further comprising categorizing the network node providing the advertised policy treatment into one of a plurality of policy tiers, wherein sequencing the network nodes into the service chain policy is based on the policy tiers.

9. The method of claim 1, wherein determining the network nodes that provide the policy treatments is based on a destination virtual overlay network that is associated with the destination end point.

10. A computer program product comprising computer executable instructions stored on a non-transitory computer readable medium that when executed by a processor causes a node to perform the following:
intercept an address resolution message sent by a tenant endpoint and intended for a default gateway, wherein the address resolution message requests a default gateway address of the default gateway;
transmit to the tenant endpoint an address of the node instead of the default gateway address requested;
receive a data packet within a source virtual overlay network using the address of the node;
determine that one or more network service functions to treat the data packet in order to forward the data packet to a destination virtual overlay network is not maintained by the node;
obtain a service chain policy comprising a list of network nodes that provide the network service functions sequenced according to the network service functions;
encapsulating the data packet with an address of a first network node offering a first service;
transmit the data packet to the first network node for application of the first service;
receiving the data packet back from the first network node after application of the first service to the data packet; and
encapsulating the data packet with an address of a second network node offering a second service and forwarding the data packet to the second network node for application of the second service.

11. The computer program product of claim 10, wherein the destination virtual overlay network and the source virtual overlay network are located within a same tenant network.

12. The computer program product of claim 10, wherein the destination virtual overlay network and the source virtual overlay network are different virtual networks that belong to different tenant networks.

13. An apparatus for providing inter-network forwarding, comprising:
a receiver configured to:
intercept an address resolution message sent by a tenant endpoint and intended for a default gateway, wherein the address resolution message requests a default gateway address of the default gateway; and
receive, within a first virtual network, a data packet destined for a destination end point located in a second virtual network using an address of the apparatus instead of the default gateway address;
a processor coupled to the receiver, wherein the processor is configured to:
determine that a plurality of network service functions are unavailable to provide a plurality of treatment policies used to route the data packet between the first virtual network and the second virtual network; and
obtain a service chain policy comprising a sequence of network nodes that provide the network service functions for the data packet to traverse to reach to the destination end point; and
a transmitter coupled to the processor and configured to:
transmit to the tenant endpoint the address of the apparatus instead of the default gateway address requested;
encapsulate the data packet with an address of a first network node offering a first service in the service chain policy;
forward the data packet to the first network node sequenced in the service chain policy for application of the first service;
receive the data packet back from the first network node after application of the first service to the data packet; and
encapsulate the data packet with an address of a second network node offering a second service and forwarding the data packet to the second network node for application of the second service.

14. The apparatus of claim 13, wherein the receiver is further configured to receive a network service function advertisement message that identified an advertising network node that provides one of the treatment policies.

15. The apparatus of claim 14, wherein the advertisement message comprises an address associated with the advertising network node, a list of network service functions provided by the advertising network node, or a list of virtual networks that the advertising network node is responsible for.

16. The apparatus of claim 14, wherein the network service function advertisement message is a link advertisement message for an Interior Gateway Protocol (IGP).

17. The apparatus of claim 13, wherein a Border Gateway Protocol (BGP) is used to distribute route information to the apparatus, and wherein the apparatus participates in a layer 2 (L2)-virtual private network (VPN).

* * * * *